United States Patent

Saeki

[11] Patent Number: 5,956,318
[45] Date of Patent: Sep. 21, 1999

[54] ORTHOGONAL FREQUENCY DIVISION MULTIPLEXING

[75] Inventor: Tomoki Saeki, Yokohama, Japan

[73] Assignee: Samsung Electronics Co., Ltd., Kyungki-Do, Rep. of Korea

[21] Appl. No.: 08/774,225

[22] Filed: Dec. 27, 1996

[30] Foreign Application Priority Data

Jan. 29, 1996 [JP] Japan ................... 8-013324

[51] Int. Cl.$^6$ .............. H04L 27/32; H04L 7/02
[52] U.S. Cl. .......... 370/206; 370/210; 370/343; 370/480; 370/503; 375/327; 375/362
[58] Field of Search .................. 370/206, 208, 370/210, 503, 507, 518, 504, 509, 510, 512, 343, 480; 375/354, 356, 359, 362, 375, 298, 300, 327, 348, 355, 363, 364, 373, 376; 455/502

[56] References Cited

U.S. PATENT DOCUMENTS

| | | |
|---|---|---|
| 5,444,697 | 8/1995 | Leung et al. .................. 370/207 |
| 5,471,464 | 11/1995 | Ikeda ........................ 370/206 |
| 5,602,835 | 2/1997 | Seki et al. .................. 370/206 |
| 5,608,764 | 3/1997 | Sugita et al. ............... 375/344 |

*Primary Examiner*—Chi H. Pham
*Assistant Examiner*—Ricky Q. Ngo
*Attorney, Agent, or Firm*—Sughrue, Mion, Zinn, Macpeak & Seas, PLLC

[57] ABSTRACT

In an orthogonal frequency division modulation (OFDM) apparatus and method, a transmitter produces a clock and a reference signal to provide an accurate phase in modulation of a carrier. A receiver is thus able to reproduce the reference signal, even if the signal-to-noise (S/N) ratio of the carrier is poor. The OFDM method includes the steps of AM-modulating a group of digital signals with a plurality of carriers, in which a reference signal is frequency-modulated at a symbol period, combining the AM-modulated carrier and modulating the combined carrier into a main carrier, detecting the main carrier by phase-locking the frequency-modulated reproduced reference signal with the transmitted reference signal and fast-Fourier-transforming the combined carrier to demodulate the digital signal.

14 Claims, 11 Drawing Sheets

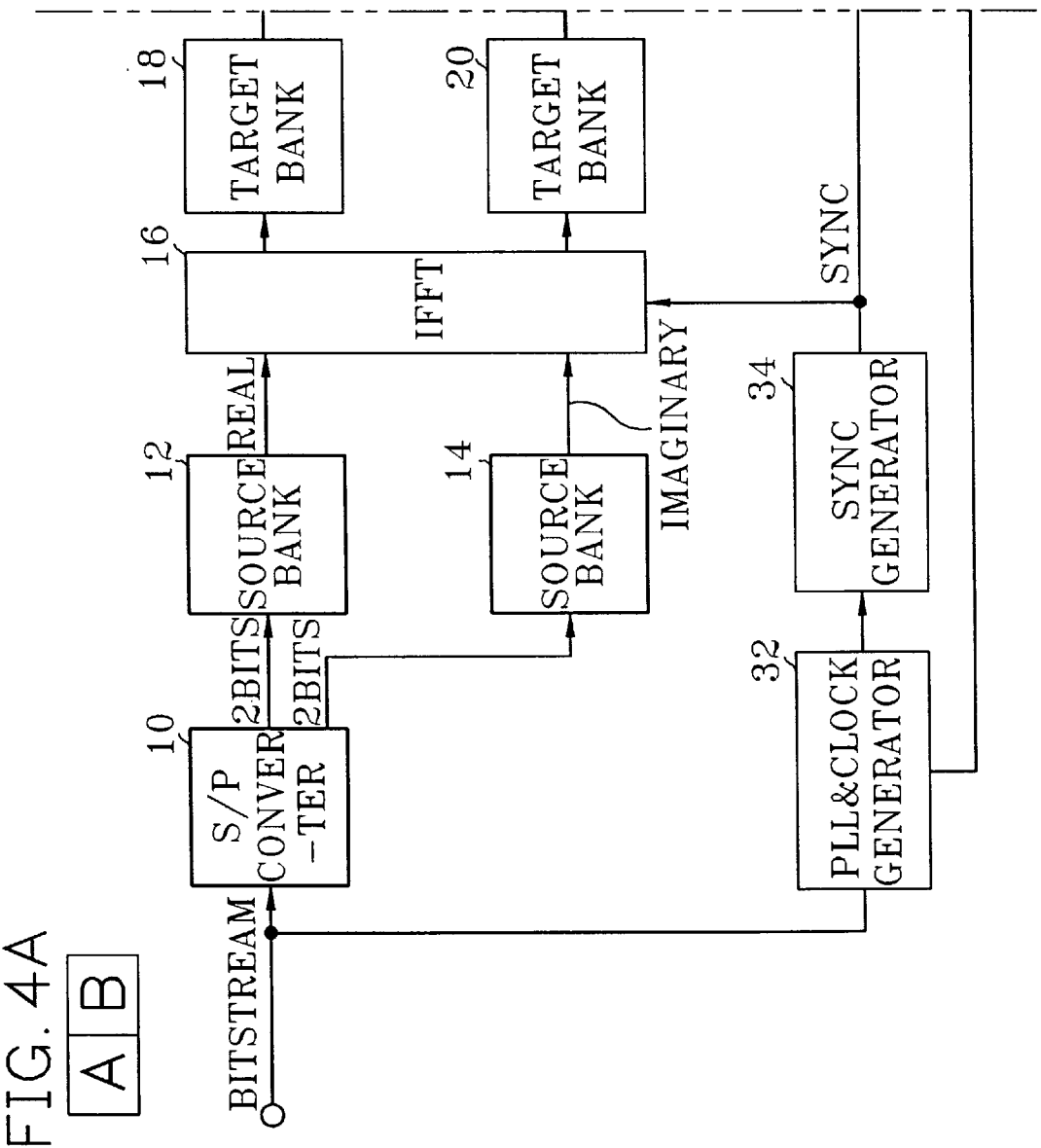

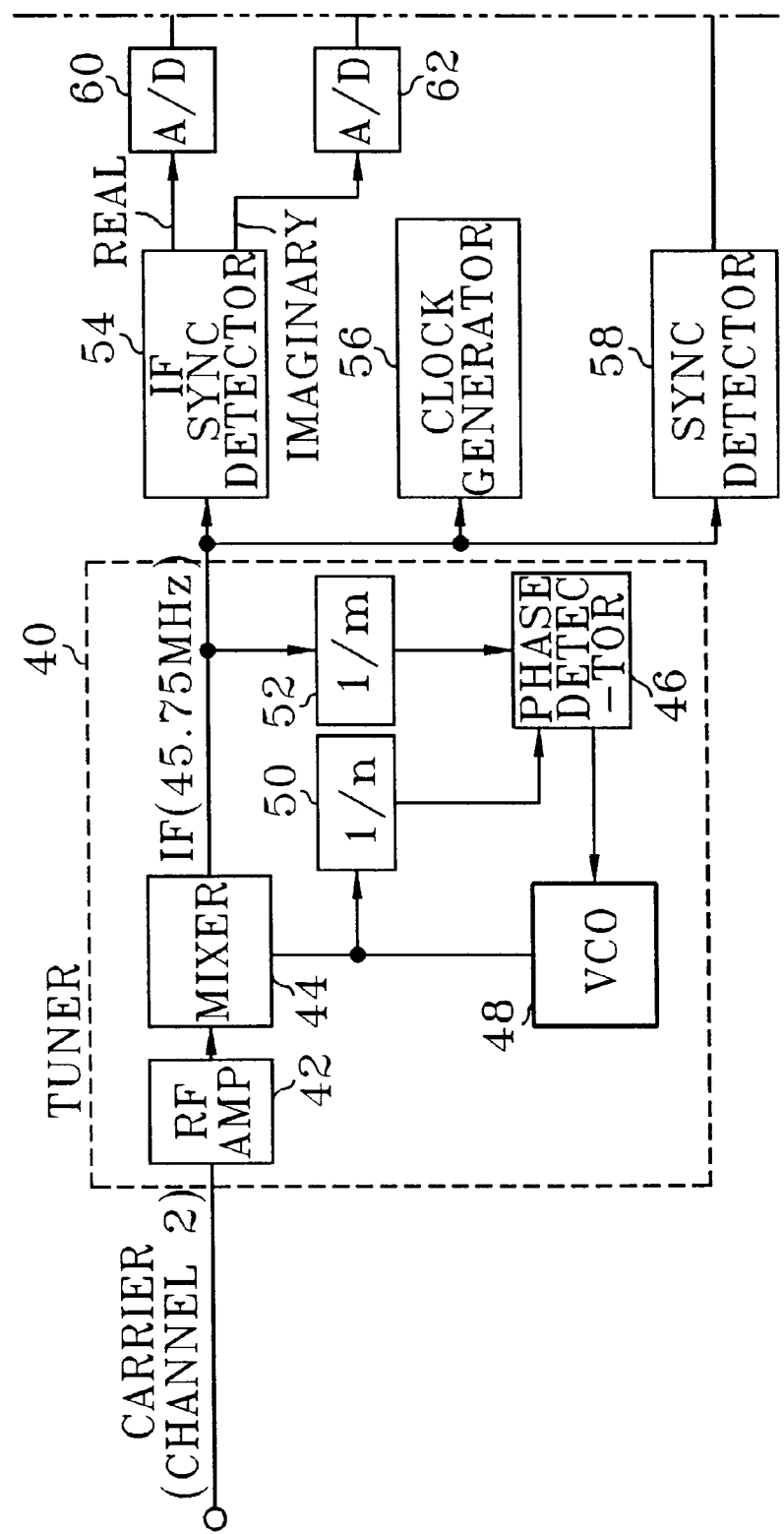

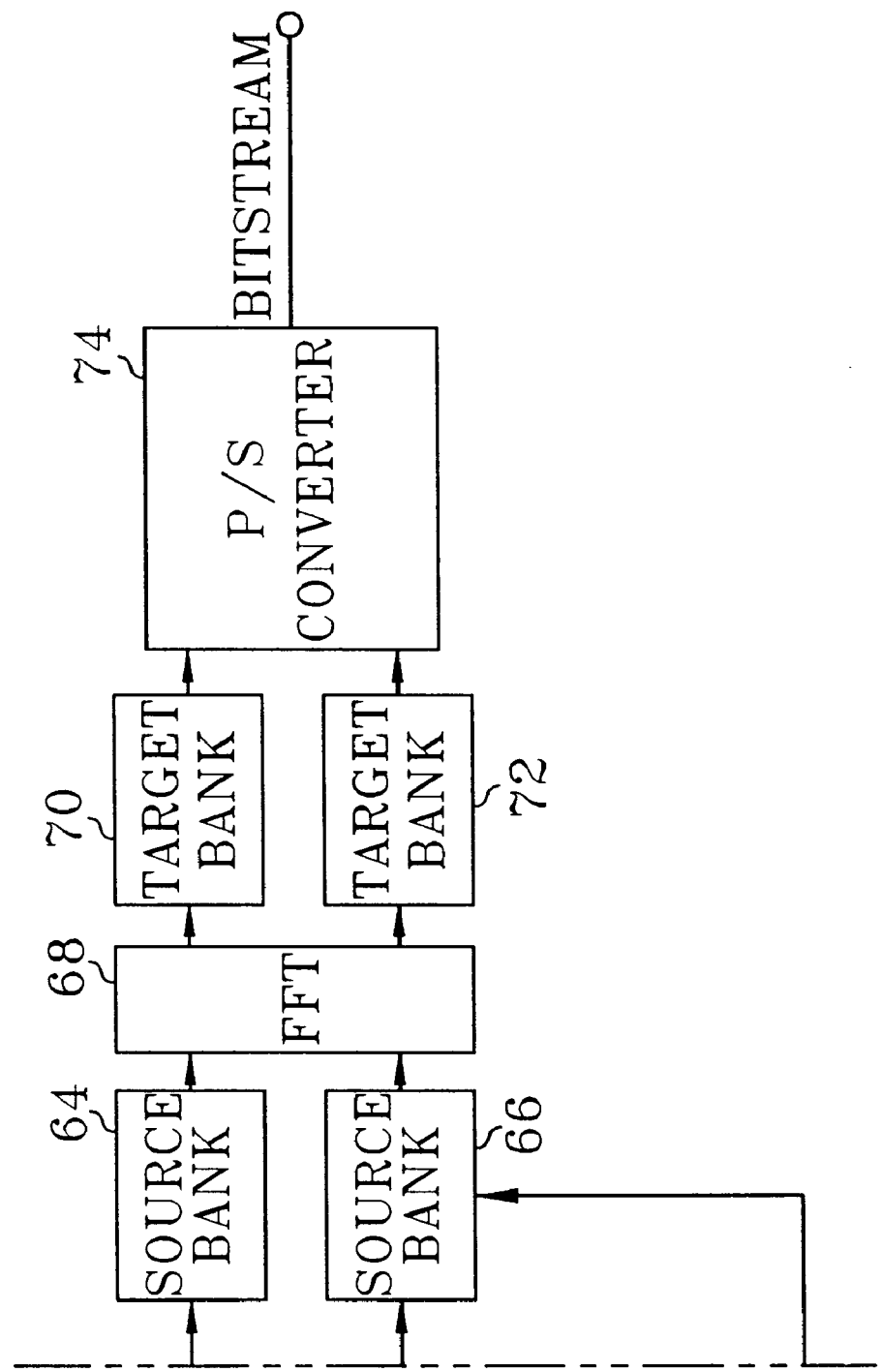

ORTHOGONAL FREQUENCY DIVISION MULTIPLEXING

BACKGROUND OF THE INVENTION

The present invention relates in general to a modulation and demodulation technique for use in, as examples, broadcasting and communication-related applications. More particularly, the invention is directed to an improved manner of synchronizing a combined wave signal in an orthogonal frequency division multiplexing (OFDM) method. The present invention also relates to an OFDM modulator and demodulator and a quadrature amplitude modulation (QAM) modulator and demodulator for implementing the improved synchronization method.

In a transmitting station of a conventional OFDM system, group of a digital signals within a certain time period are amplitude-modulated (hereinafter, called AM-modulated) with a plurality of carriers. The carriers are then combined, and modulated onto a main carrier, for example, a channel-2 carrier. The modulated result is finally transmitted to a receiving station. In the receiving station, the main carrier is detected and the OFDM combined wave is fast-Fourier-transformed, to thereby demodulate a desired digital signal. The transfer of data between the transmission and receiving stations requires synchronization for proper demodulation of the combined wave. Therefore, it is necessary to use a synchronization signal to properly synchronize clocks at the transmission station with the clocks at the receiving station.

In conventional OFDM synchronization methods, the transmission station and receiving station are not synchronized sufficiently to enable stable operations when noise is contained in the carrier. That is, the transmission station does not modulate and transmit a radio frequency (RF) carrier at the first symbol period in a frame, while the receiving station phase locks to the carrier during the non-modulation interval of time, to synchronize with the transmission end. Thus, according to the above conventional method, a reference signal locked to the carrier within the non-modulation time interval, becomes unstable due to generation phase errors in the carrier when noise is contained in the carrier. This is a problem and disadvantage of the conventional OFDM system.

SUMMARY OF THE INVENTION

To solve the above problems and disadvantages, it is an object of the present invention to provide an OFDM method, a synchronization method, and to provide a modulator and demodulator for performing the OFDM method, in which a reference signal having a highly accurate phase is produced when the OFDM modulator at the transmission station produces a clock and reference signal for modulation (for example, QAM). At a receiving station, the OFDM demodulator reproduces the reference signal having the highly accurate phase, even though the signal-to-noise (S/N) ratio of the carrier is low.

To accomplish the above and other objects of the present invention, there is provided an orthogonal frequency division multiplexing (OFDM) method. The method includes the steps of AM-modulating a group of digital signals with a plurality of carriers, combining the plurality of AM-modulated carriers and modulating the combined carriers onto a main carrier, detecting the main carrier, and fast-Fourier-transforming the combined carrier to demodulate the digital signal. The AM-modulation step includes frequency-modulating a reference signal during a symbol period, and AM-modulating the digital signals during other symbol periods. The detecting step includes phase-locking the reproduced reference signal with the frequency-modulated transmitted reference signal.

In further accordance with the present invention, there is also provided an orthogonal frequency division multiplexing (OFDM) synchronization method for use in a modulator for AM-modulating a group of digital signals with a plurality of carriers, combining the AM-modulated carriers and modulating the combined carrier onto a main carrier, and a demodulator for detecting the main carrier, and fast-Fourier-transforming the combined carrier to demodulate the digital signal. The OFDM synchronization method includes the steps of: frequency-modulating the reference signal in the modulator during a symbol period, and phase-locking the reproduced reference signal with the frequency-modulated reference signal in order to produce a reference clock for the demodulator.

Even further, the present invention provides an orthogonal frequency division multiplexing (OFDM) modulator. The modulator includes a serial-to-parallel (S/P) converter for converting a bitstream of input data from serial to parallel format, an inverse fast Fourier transformer operative to inverse-fast-Fourier-transform data output from the S/P converter, a digital-to-analog (D/A) converter for converting the inverse fast Fourier transformed data from digital to analog form, a sync modulator for AM-modulating data output by the D/A converter, and for generating a reference signal for synchronization, and means for converting the AM-modulated data onto a carrier frequency. The sync modulation means includes a FM signal generator for generating the reference signal, including a frequency-modulated reference signal and a phase-shifted reference signal, an AM-modulator for AM-modulating the frequency-modulated reference signal and the phase-shifted reference signal and producing first and second AM-signals, respectively, and a controller for suppressing the second AM signal during predetermined sync periods.

Still, even further, in accordance with the present invention, there is provided an orthogonal frequency division multiplexing (OFDM) demodulator. The demodulator includes a tuner which receives a carrier having a predetermined frequency, and produces an intermediate frequency (IF) signal phase-locked with the carrier, an IF sync detector, coupled to an output of the tuner to receive the IF signal, for producing a real signal and an imaginary signal from the IF signal, an analog-to-digital (A/D) converter, coupled to outputs of the IF sync detector to receive the real and imaginary signals, for converting the real signal and the imaginary signal from analog to digital form, a fast-Fourier transformer operative to discrete-fast-Fourier-transform the real and imaginary signals output from the A/D converter and producing a demodulated signal, a parallel-to-serial (P/S) converter for converting the discrete-fast-Fourier-transformed real and imaginary signals into serial data, and for outputting a bitstream of data. The demodulator also includes a sync detector, coupled to the output of the tuner for receiving the IF signal, and including means for detecting a frequency of the IF signal, means for demodulating a reference signal, and means for producing a sync signal.

BRIEF DESCRIPTION OF THE DRAWINGS

The preferred embodiments of the present invention are described with reference to the drawings wherein:

FIGS. 4A and 4B illustrate block diagrams of an OFDM modulator according a preferred embodiment of the present invention.

FIGS. 6A and 6B illustrate block diagrams of an OFDM demodulator according to a preferred embodiment of the present invention.

DETAILED DESCRIPTION OF PREFERRED EMBODIMENTS OF THE PRESENT INVENTION

Preferred embodiments of the present invention will be described below in more detail with reference to the accompanying drawings.

Figure 1:
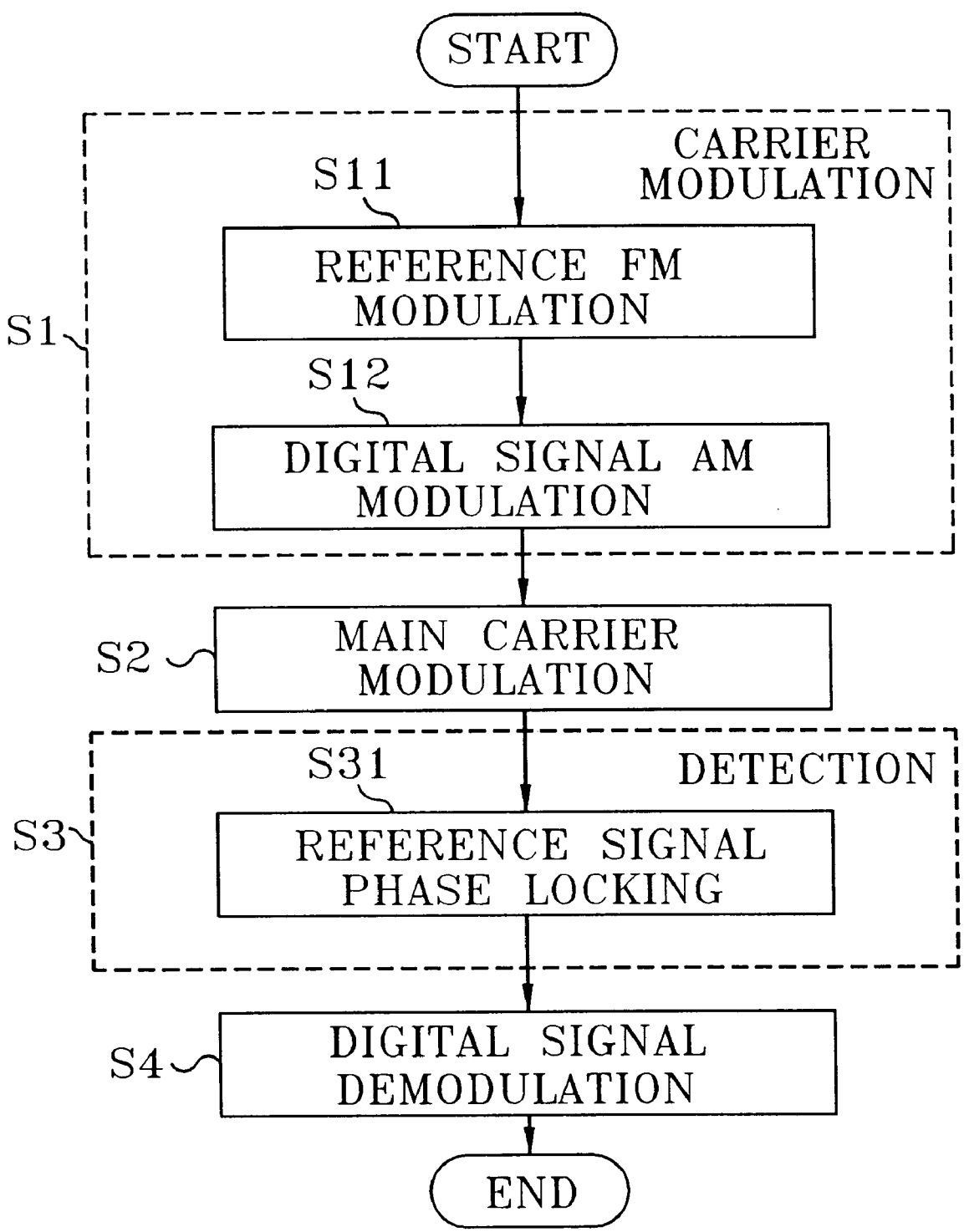
FIG. 1 is a flowchart diagram for explaining a method of operation of the present invention.

Referring to FIG. 1, an orthogonal frequency division multiplexing (OFDM) method includes the steps of (S1) AM-modulating a group of digital signals with a plurality of carriers, (S2) combining the AM-modulated carriers and modulating the combined carrier onto a main carrier, (S3) detecting the main carrier, and (S4) performing a fast-Fourier-transform on the combined carrier to demodulate the digital signal. The AM-modulation step (S1) includes the steps of (S11) frequency-modulating (hereinafter called FM-modulating) a reference signal in a symbol period, and (S12) AM-modulating the digital signals in the other symbol periods. The detecting step (S3) includes the step of (S31) phase-locking the reproduced reference signal with the FM-modulated transmitted reference signal.

Figure 2:
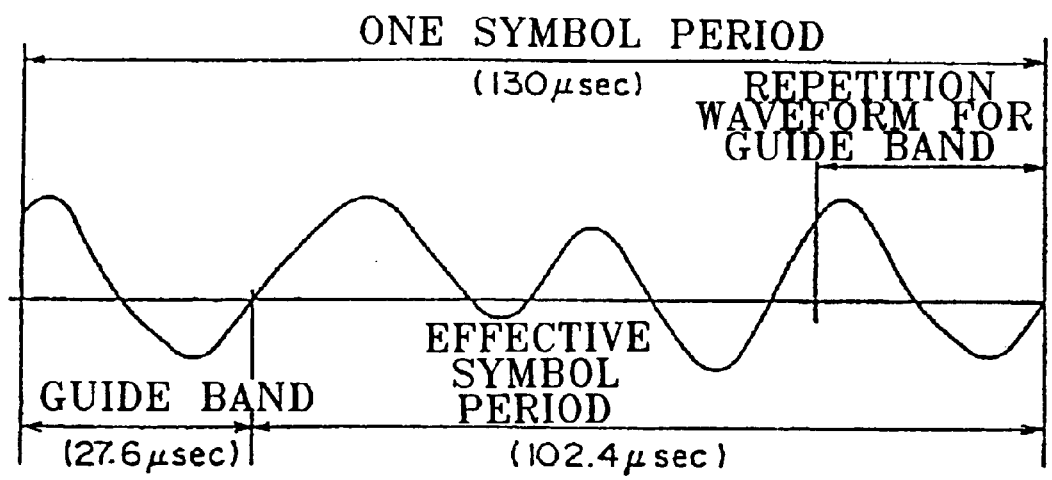
FIG. 2 is a graphic diagram for explaining the format of an OFDM signal.
Figure 3:
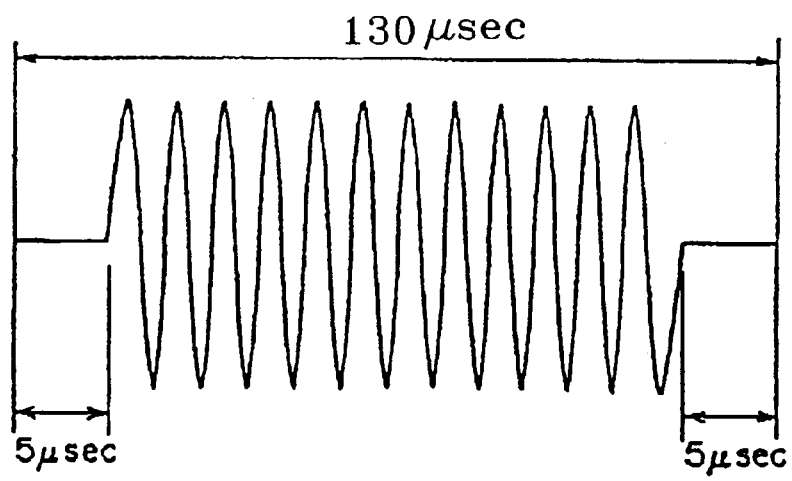
FIG. 3 is a waveform diagram for explaining a sync signal.

FIG. 2 is a graphic illustration for explaining the format of an OFDM signal. One symbol period is composed of an effective symbol period and a guide band. One frame is formed of a set of symbols. For example, according to the preferred embodiment of the present invention, one frame is formed of 127 symbols. A sync signal is inserted at the beginning of the frame. FIG. 3 is a waveform diagram for explaining the format of a sync signal which is used in this embodiment of the present invention. The sync signal includes 12 cycles of a 100 KHz signal whose phase is identical with the clock. The width of the sync signal is 130 $\mu$sec. A transmitter FM-modulates the sync signal (as shown in FIG. 3) and transmits the modulated result. Table 1 below shows the specifications of the OFDM system constructed in accordance with the present invention.

TABLE 1

Specifications of the OFDM system

| Item | Value |
| --- | --- |
| number of carrier | 1001 |
| guided band | 27.6 $\mu$sec |

TABLE 1-continued

Specifications of the OFDM system

| Item | Value |
| --- | --- |
| effective symbol interval | 102.4 $\mu$sec |
| bit rate | 30.8 Mbit/sec |
| main clock | 10.0 MHZ |
| one frame | 127 symbols |
| sync signal | 100 KHZ 12 cycles |
| clock phase | carrier locking |
| one symbol | 130 $\mu$sec |

Hereinbelow, an OFDM system satisfying the above specifications will be described.

Figure 4B:
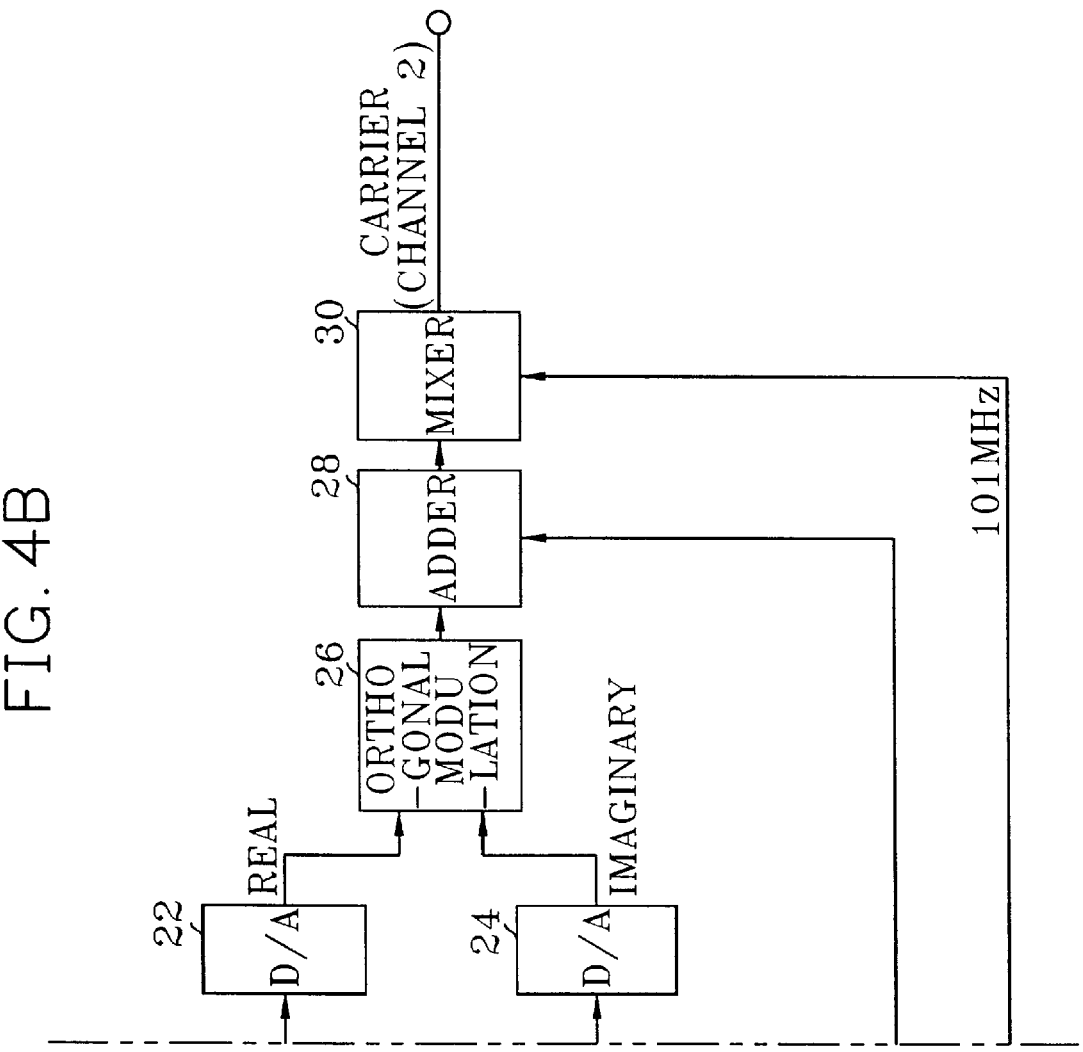

FIGS. 4A and 4B illustrate block diagrams of an OFDM modulator according to a preferred embodiment of the present invention. The OFDM modulator includes a S/P converter 10 for converting a received input data bitstream from serial to parallel format, an inverse fast Fourier transformer (IFFT) 16 for inverse-fast-Fourier-transforming the S/P converted signal, a quadrature two-phase modulator 26 for quadrature two-phasing-modulating analog outputs of the IFFT 16, an adder 28 for adding a sync signal to the quadrature-two-phase-modulated signal, and a mixer 30 for mixing a reference signal and the quadrature two-phase-modulated signal, to produce a carrier.

More specifically, the serial input bitstream is converted into two 2-bit signals, including a real signal and an imaginary signal, by the S/P converter 10. The 2-bit real signal and the 2-bit imaginary signal are supplied to source banks 12 and 14, respectively, and formatted into units of one symbol each, which is suitable for an input format of the IFFT 16. The formatted data is then supplied to the IFFT 16. For example, each source bank 12, 14 outputs 2-bit data with respect to 1024 carriers. The IFFT 16 produces one carrier based on the amplitude of the input data consisting of the real signal and the imaginary signal, to thereby output amplitude data of a combined wave of the 1024 carriers. Thus, 1024 amplitude data are output. The 1024 amplitude data of the combined wave of the carrier output from the IFFT 16 are recorded in target banks 18 and 20, which are connected to outputs of the IFFT 16.

Figure 5:
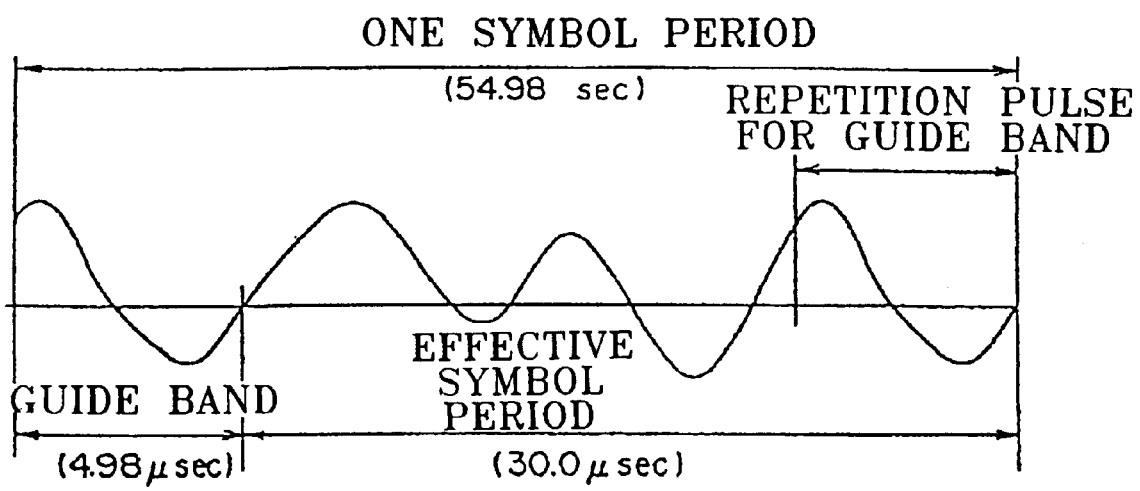
FIG. 5 is a waveform diagram for explaining a combined wave signal obtained by an inverse fast Fourier transform of the OFDM modulator of FIGS. 4A and 4B.

FIG. 5 illustrates an amplitude corresponding to one symbol period of a combined wave output from the IFFT 16 and recorded in the target banks 18 and 20. The target banks 18 and 20 add the waveform data of a guide band to the recorded combined wave, to output a predetermined sampling frequency. The digital signals output from the target banks 18 and 20 are converted into analog signals by the D/A converters 22 and 24, respectively, and then supplied to the quadrature two-phase modulator 26.

The quadrature two-phase modulator 26 AM-modulates the real signal supplied from the D/A converter 22 and the imaginary signal supplied from the D/A converter 24 into sine and cosine carriers, respectively, and adds the AM-modulated sine carrier and the cosine carrier, to generate a quadrature amplitude modulation (QAM) signal with a suppressed carrier.

The adder 28 receives a sync signal from the sync generator 34 and the QAM-modulated signal output from the quadrature two-phase modulator 26, and adds the two signals together. The sync generator 34 is connected to a phase locked loop (PLL) and clock generator 32, which generates a synchronized clock or a reference carrier signal synchronized with the input bitstream signal, to generate a sync signal from the synchronized clock.

The mixer 30 is connected to an output of the adder 28 and the PLL and clock generator 32, and mixes a reference signal of 101 MHZ obtained from the PLL and clock generator 32 with the QAM-modulated signal output by the adder 28, to produce a carrier of 70.2 MHZ, from which a channel-2 carrier (per U.S.A. standard), as an example, is obtained.

FIGS. 6A and 6B illustrate block diagrams of an OFDM demodulator according to a preferred embodiment of the present invention. The OFDM demodulator includes a tuner 40. The tuner 40 may be the same type of tuner as that found in a conventional television receiver. The carrier of channel 2 is input to the tuner and phase-locked with an intermediate frequency signal to produce an IF signal that is output by the tuner 40.

An IF sync detector 54 is connected to the tuner 40, and receives the IF signal. The IF sync detector 54 uses a sync detection method for demodulation to produce a real signal and an imaginary signal from the input IF signal. The clock generator 56 generates a clock signal, which is phase-locked to the IF based on the IF signal received from the tuner 40. The sync detector 58 AM-detects the IF signal received from the tuner 40, and detects a temporal position of a sync signal from a reference signal having, for example, a frequency of 100 KHZ. The sync signal is then used in the OFDM demodulator.

The analog real and imaginary signals demodulated in the IF sync detector 54 are converted into digital signals by the A/D converters 60 and 62, respectively, and then supplied to source banks 64 and 66, respectively. The source banks 64 and 66 convert the input digital data into a data format suitable for use in a fast Fourier transformer (FFT) 68.

The real and imaginary signals are transferred from the source banks 64, 66 to the FFT 68 which performs discrete fast-Fourier transform. The FFT 68 conducts a fast-Fourier-transform operation on the combined carrier (for example, composed of 1024 data) obtained from the input real and imaginary signals, and calculates the value of the amplitude of each carrier to demodulate the digital signals. The demodulated two digital signals are supplied to target banks 70, 72, and then to a P/S converter 74 which produces a serial signal from parallel data (e.g., 2 bits) received from the target banks 70 and 72. The P/S converter 74 outputs a bitstream corresponding to the input bitstream received by the encoder.

Figure 7:
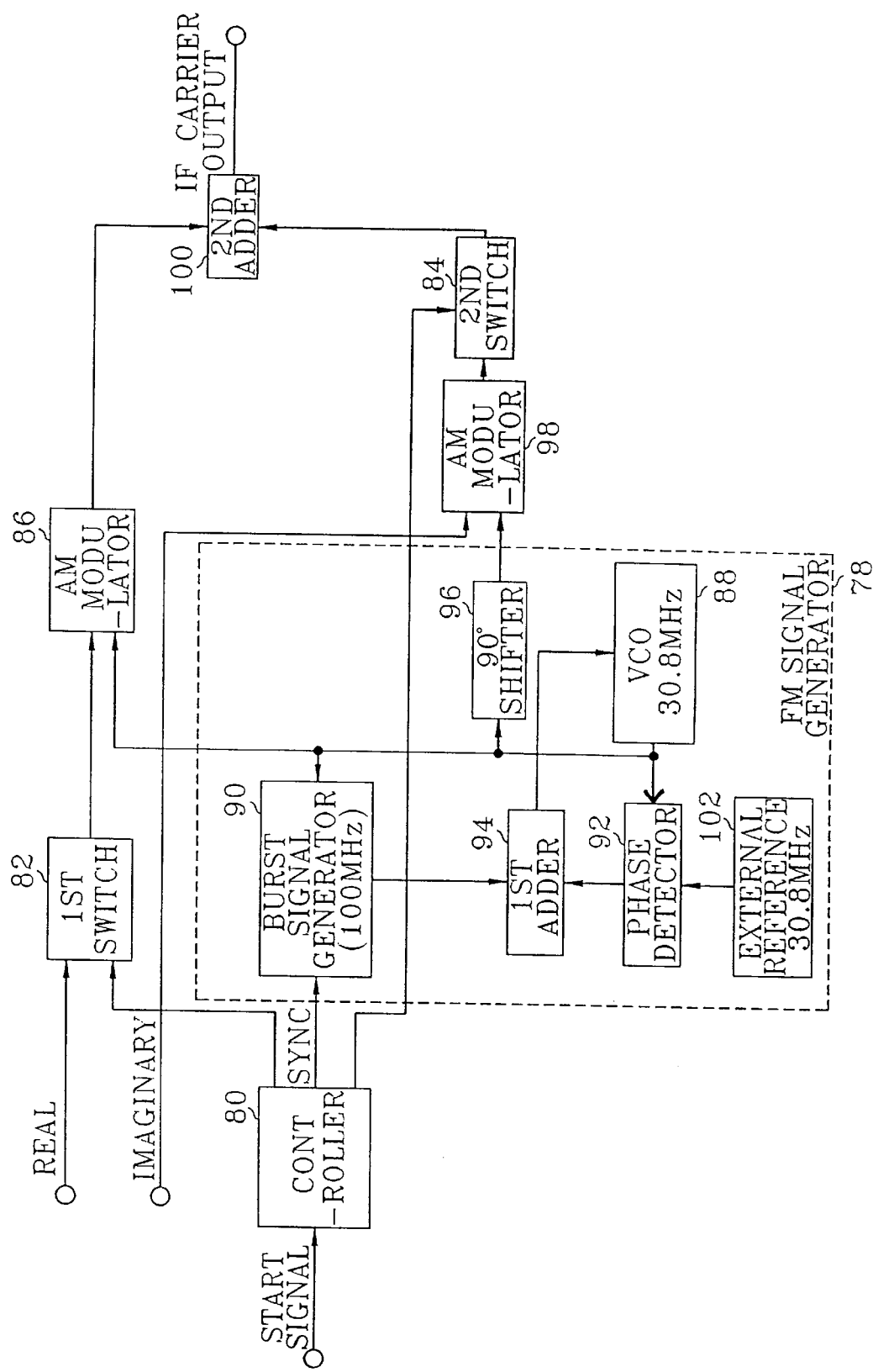
FIG. 7 is a block diagram of the sync and modulation circuitry in the OFDM modulator of FIG. 4.

FIG. 7 illustrates a block diagram of the sync and modulation circuitry in the OFDM modulator of FIG. 4. For the sake of illustration, an IF carrier of 30.8 MHZ is used as an example to explain the operation of the sync and modulation circuitry. The sync and modulation circuitry includes a FM signal generator 78 for generating a FM-modulated voltage controlled oscillation signal and a 90° phase-shifted signal thereof, a first AM-modulator 86 for AM-modulating the FM-modulated signal (a carrier) into a real signal, a second AM-modulator 98 for AM-modulating the 90° phase-shifted carrier into an imaginary signal, and a second adder 100 for adding the respective carriers modulated in the first and second AM-modulators 86 and 98. The sync and modulation circuitry further includes a first switch 82 for switching the real signal to the first AM-modulator 86, a second switch 84 for switching the output of the second AM-modulator 98 to the second adder 100, and a controller 80 for controlling (i.e., activating and deactivating) the first and second switches 82, 84.

The operation of the FM signal generator 78 which generates the FM-modulated voltage controller oscillation signal and the 90° phase-shifted signal will be described.

The IF carrier is phase-locked with the transmission frequency of the bitstream, to thereby oscillate at 30.8 MHZ. The phase-locking operation is performed with an internal voltage controlled oscillator (VCO) 88, which adjusts the oscillation frequency based on the amount of direct-current applied thereto. A phase detector 92 compares the carrier of an external reference signal of 30.8 MHZ input from an external reference signal generator 102 with the carrier obtained from the VCO 88, and synchronizes the two carriers together. The output signal of the phase detector 92 controls the VCO 88 via the first adder 94. Since the carrier of 30.8 MHZ is FM-modulated at a reference signal of 100 KHZ, the first adder 94 superimposes the reference signal of 100 KHZ generated from a burst signal generator 90 on the output signal of the phase detector 92. When the carrier is not FM-modulated at the reference signal, the first adder 94 passes the output signal of the phase detector 92 to the VCO 88. The burst signal generator 90 divides the frequency of 30.8 MHZ into 308 subfrequencies, and produces a reference signal of 100 KHZ which is used for FM-modulation of the carrier at 100 KHZ for one symbol period. Accordingly, the 30.8 MHZ signal supplied from the VCO 88 is also supplied to the first modulator 86. Moreover, the phase of the FM-modulated carrier supplied from the VCO 88 is shifted 90° by the 90° phase shifter 96. The output of the 90° phase shifter 96 is supplied to the second modulator 98.

Next, operation of the sync and modulation circuitry will be described. The controller 80 receives a start signal and then determines the position into which the 100 KHZ reference signal is to be inserted. Next, the controller 80 switches the first and second switches 82 and 84: during a sync signal period, the controller 80 turns off the first switch 82 to prevent the real signal from passing through the first switch 82 to generate a DC signal. Thus, during the sync signal period, the FM signal output from the VCO 88 passes through the first AM modulator 86 without being AM-modulated. Meanwhile, the controller 80 turns off the second switch 84 to prevent the AM-modulated signal generated by the second AM modulator 88 from passing through the switch 84 during the sync signal period, thereby FM-modulating the sync signal in the IF signal of 30.8 MHZ.

During periods which do not include the sync signal, a quadrature two-phase modulation operation is performed on the real and imaginary signals.

Figure 8:
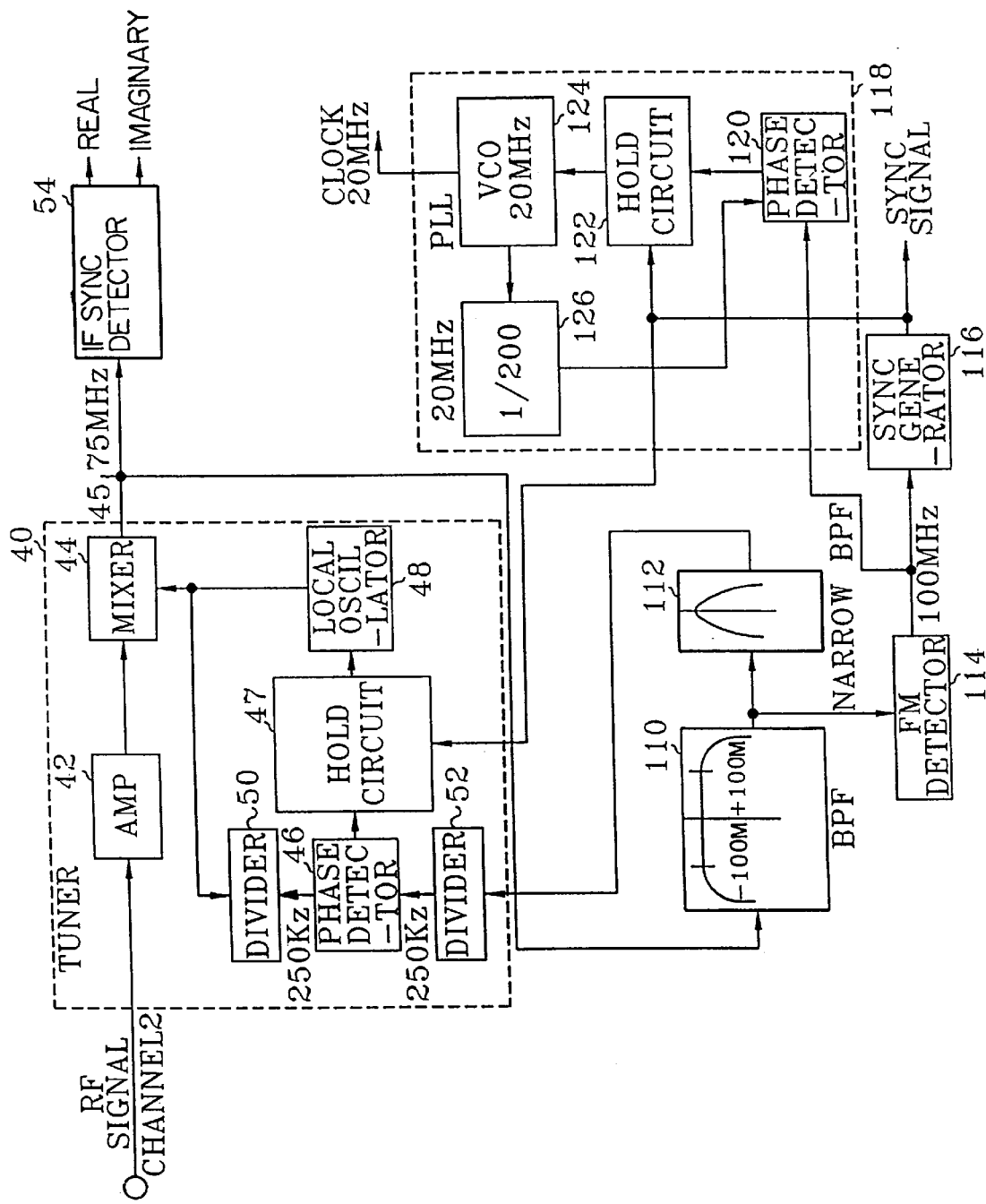
FIG. 8 is a block diagram of the clock reproduction and sync detection circuitry in the OFDM demodulator of FIG. 6.

FIG. 8 shows a block diagram of the clock reproduction and sync detection circuitry in the OFDM demodulator of FIG. 6. For the sake of illustration, the case where a channel 2 RF signal is input will be described as an example. In addition, elements common to the elements in the OFDM demodulator of FIG. 6, such as the tuner 40 and the sync detector 54, are designated by the same reference numerals.

A sync signal detector includes a band-pass filter 110, a FM detector 114, a sync generator 116, and a narrow-band-pass filter 112 of 45.75 MHZ for supplying an IF signal to a divider 52. The IF signal is divided and then phase compared in a phase detector 46 for local oscillation. A clock reproducer includes a phase lock loop of 20 MHZ.

The IF signal passes through the band-pass filter 110 of ±100 MHZ, and is supplied to the FM detector 114 to obtain a sync signal of 100 MHZ. The 100 MHZ signal is output to the sync generator 116, which produces a frame sync signal having a width of 130 μm at a frequency of 100 MHZ.

The 100 MHZ signal is also supplied to one end of a phase detector 120 in the phase lock loop 118 for reproducing a clock having a frequency of 20 MHZ. The signal output from the 20 MHZ VCO 124 is divided by 200 in a signal divider 126 to produce a 100 KHZ signal that is supplied to the other end of the phase detector 120. The phase detector 120 compares the phase of the 100 KHZ sync signal with the divided signal output from the VCO 124. The voltage of the signal output by the phase detector 120 is maintained by a hold circuit 122 during the sync signal period, in accordance with the sync signal produced by the sync signal generator 116. That is, the divided 100 KHZ signal is phase-locked with the 100 KHZ sync signal, and the phase lock loop 118 operates only during the sync signal period. By doing so, the 20 MHZ clock is reproduced from the VCO 124.

A mixer 44 produces an IF signal of 45.75 MHZ based on a local oscillation signal of 101 MHZ generated by a local oscillator 48. A phase detector 46 compares the phase of the local oscillation signal of 101 MHZ output from the VCO 48 and divided by 404 by a divider 50 with the phase of a signal which is supplied from a narrow-band-pass filter 112 and divided by 183 by a divider 52. The VCO 48 maintains the 101 MHZ local oscillation signal using the phase comparison signal. Here, the phase comparison signal is maintained by a hold circuit 47 during the sync signal period, based on the sync signal generated by the sync generator 116. The combined signal for the OFDM is modulated in a modulator as shown in FIG. 7 via an IF amplifier (not shown).

Figure 9:
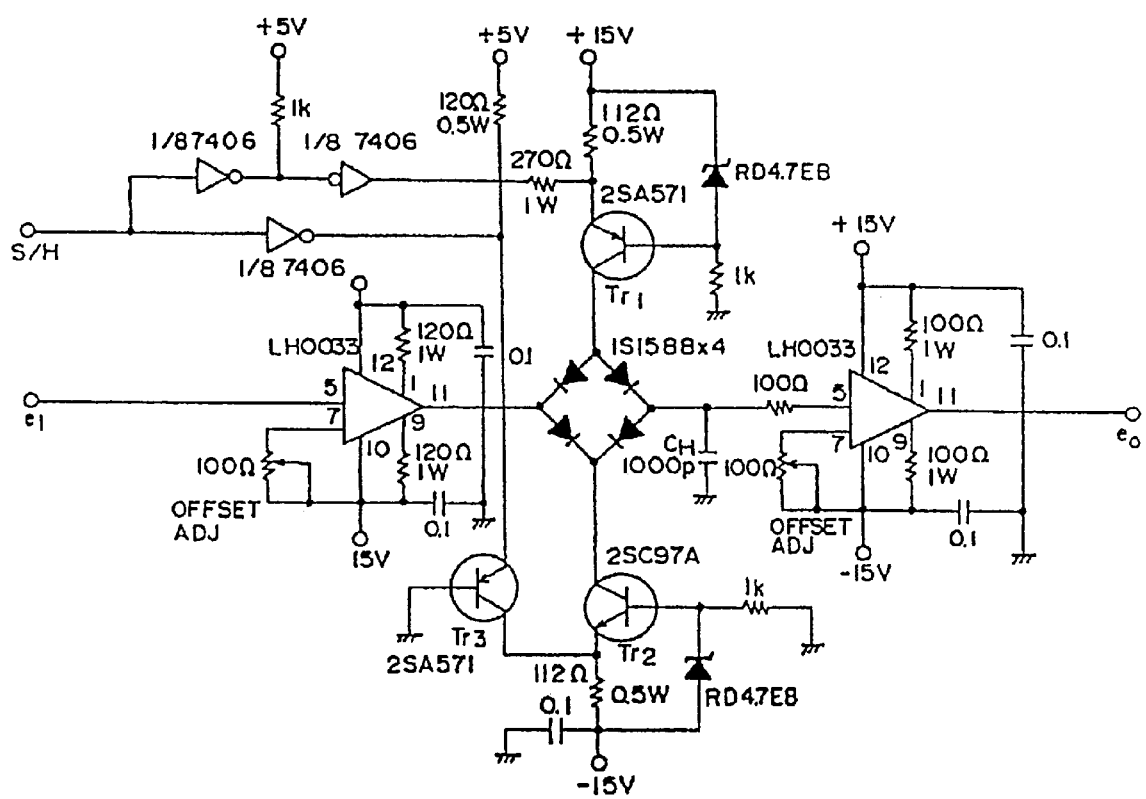
FIG. 9 is a block diagram of a hold circuit used in the OFDM demodulator of FIGS. 6A and 6B.
Figure 10:
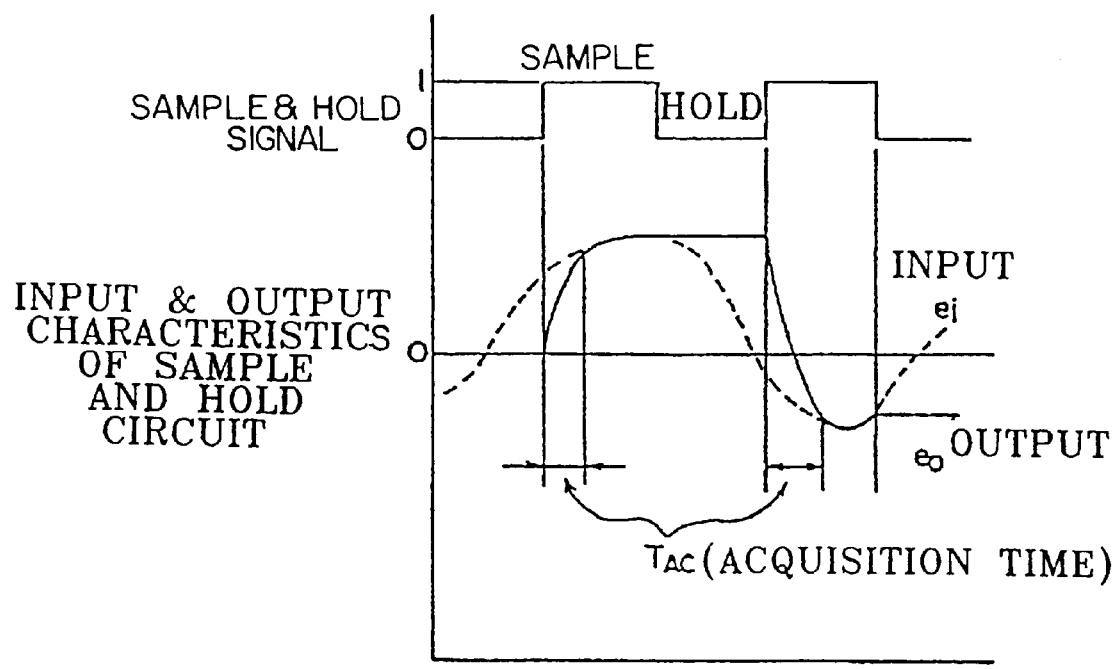
FIG. 10 is a timing diagram for explaining an acquisition time of the hold circuit of FIG. 9.

FIG. 9 is a block diagram of an exemplary high-speed hold circuit 47 or 122 used in the OFDM demodulator of FIG. 6. FIG. 10 is a timing diagram for explaining an acquisition time of the hold circuit of FIG. 9.

As described above, the OFDM method as carried out by the OFDM modulator and demodulator according to the present invention demodulates an OFDM combined wave signal having an accurate phase at a receiving station without being interrupted by noise and external signals. Moreover, the OFDM method according to the present invention can particularly obtain synchronization even if the OFDM carrier has a low level. Further, the present invention can perform an OFDM operation which can endure impulse noises. Also, the present invention can perform a strong OFDM even with external interference waves, such as ghost or identical channel interference. Using the OFDM synchronization method according to the present invention, sensitivity of a receiver can be enhanced as in a television receiver.

There has thus been shown and described a novel architecture of an OFDM system, including an OFDM demodulator and modulator and OFDM method, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. An orthogonal frequency division multiplexing (OFDM) method comprising the steps of:

AM-modulating a group of digital signals with a plurality of carriers;

combining said plurality of AM-modulated carriers to provide combined carriers and modulating the combined carriers onto a main carrier for transmission to a receiver;

detecting said main carrier at the receiver; and fast-Fourier-transforming said combined carriers to demodulate the digital signals;

wherein said AM-modulating step comprises the steps of frequency-modulating a reference signal during a symbol period to provide a frequency modulated reference signal, and AM-modulating the digital signals during other symbol periods, and wherein said detecting step comprises the step of phase-locking the reference signal which is reproduced at the receiver with the frequency-modulated reference signal which is received at the receiver.

2. An orthogonal frequency division multiplexing (OFDM) synchronization method for use in a modulator for AM-modulating a group of digital signals with a plurality of carriers, combining the AM-modulated carriers and modulating the combined carrier onto a main carrier, and a demodulator for detecting the main carrier, and fast-Fourier-transforming the combined carrier to demodulate the digital signal, said OFDM synchronization method comprising the steps of:

frequency-modulating a reference signal in the modulator during a symbol period; and phase-locking the reference signal reproduced at the demodulator with the frequency-modulated reference signal in order to produce a reference clock for the demodulator.

3. The OFDM synchronization method according to claim 2, wherein said frequency-modulated reference signal has a frequency obtained by dividing the frequency of an IF carrier into an integer number of subfrequencies.

4. The OFDM synchronization method according to claim 3, further comprising the step of phase-locking a second reference signal with said main carrier.

5. An orthogonal frequency division multiplexing (OFDM) modulator, comprising:

a serial-to-parallel (S/P) converter for converting a bitstream of input data from serial to parallel format;

an inverse fast Fourier transformer operative to inverse-fast-Fourier-transform data output from said S/P converter;

a digital-to-analog (D/A) converter for converting the inverse fast Fourier transformed data from digital to analog form;

sync modulation means for AM-modulating data output by said D/A converter, and for generating a reference signal for synchronization; and means for converting said AM-modulated data onto a carrier frequency, wherein said sync modulation means comprises:

a FM signal generator for generating said reference signal, including a frequency-modulated reference signal and a phase-shifted reference signal;

an AM-modulator for AM-modulating said frequency-modulated reference signal and said phase-shifted reference signal and producing first and second AM-signals, respectively; and a controller for suppressing said second AM signal during predetermined sync periods.

6. The orthogonal frequency division multiplexing (OFDM) modulator as defined by claim 5, further comprising first and second source banks, and first and second target banks, wherein said S/P converter produces two sets of parallel data, including a real data signal and an imaginary data signal; said first and second source banks receiving and formatting said real data signal and said imaginary data signal, respectively; and supplying said formatted real data signal and imaginary data signal to said inverse fast Fourier transformer, said first and second target banks being coupled to outputs of said inverse fast Fourier transformer for receiving transformed real and imaginary signals, and outputting said transformed real and imaginary signals to said D/A converter.

7. The orthogonal frequency division multiplexing (OFDM) modulator as defined by claim 6, wherein said sync modulation means further comprises a quadrature two-phase modulator for AM-modulating said transformed real signal and imaginary signal into sine and cosine carriers, and for adding said AM-modulated sine and cosine carriers to generate a quadrature amplitude modulation signal with a suppressed carrier.

8. The orthogonal frequency division multiplexing (OFDM) modulator as defined by claim 7, further comprising a sync generator for producing a sync signal, and an adder, said adder adding said sync signal and said quadrature amplitude modulation signal together.

9. The orthogonal frequency division multiplexing (OFDM) modulator as defined by claim 8, further comprising a phase lock loop and clock generator for generating a clock signal synchronized with said bitstream of input data and, and a mixer coupled to an output of said adder and phase lock loop and clock generator, said mixer producing a carrier of a predetermined frequency.

10. An orthogonal frequency division multiplexing (OFDM) demodulator, comprising:
   a tuner receiving a carrier having a predetermined frequency, and producing an intermediate frequency (IF) signal phase-locked with said carrier;
   an IF sync detector, coupled to an output of said tuner to receive said IF signal, for producing a real signal and an imaginary signal from said IF signal;
   an analog-to-digital (A/D) converter, coupled to outputs of said IF sync detector to receive said real and imaginary signals, for converting said real signal and said imaginary signal from analog to digital form;
   a fast-Fourier transformer operative to discrete-fast-Fourier-transform said real and imaginary signals output from said A/D converter and producing a demodulated signal;
   a parallel-to-serial (P/S) converter for converting the discrete-fast-Fourier-transformed real and imaginary signals into serial data, and for outputting a bitstream of data; and
   a sync detector, coupled to said output of said tuner for receiving said IF signal, and including means for detecting a frequency of said IF signal, means for demodulating a reference signal, and means for producing a sync signal.

11. The orthogonal frequency division multiplexing (OFDM) demodulator as defined by claim 10, further comprising a clock reproducer for reproducing a reference clock by phase-locking an internal reference signal with the reference demodulated and produced by said sync detector.

12. The orthogonal frequency division multiplexing (OFDM) demodulator as defined by claim 10, further comprising first and second source banks, coupled to outputs of said A/D converter, for receiving and formatting said real signal and imaginary signal output by said A/D converter, said first and second source banks outputting said formatted real and imaginary signals to said fast-Fourier transformer; and first and second target banks coupled to outputs of said fast-Fourier transformer for receiving and storing said demodulated signal output by said fast-Fourier transformer.

13. The orthogonal frequency division multiplexing (OFDM) demodulator as defined by claim 12, wherein said P/S converter is coupled to outputs of said first and second target banks.

14. The orthogonal frequency division multiplexing (OFDM) demodulator as defined by claim 10, wherein said tuner comprises: a local oscillator for producing a clock signal having an intermediate frequency; a mixer for combining said carrier with said clock signal to produce said IF signal; a phase detector circuit for comparing the phase of said clock signal with the phase of said IF signal and outputting a phase compare signal accordingly, wherein said local oscillator is responsive to said phase compare signal for adjusting the phase and frequency of said clock signal.

* * * * *